Nov. 15, 1955   J. P. HUBBELL   2,723,793
NOZZLES
Filed Aug. 23, 1951   2 Sheets-Sheet 1
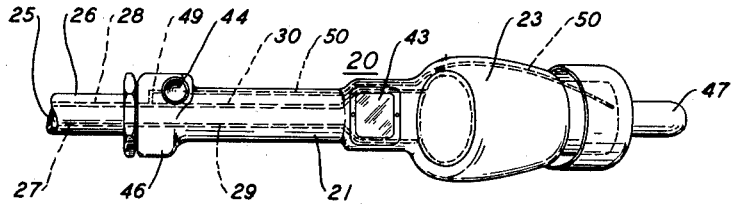
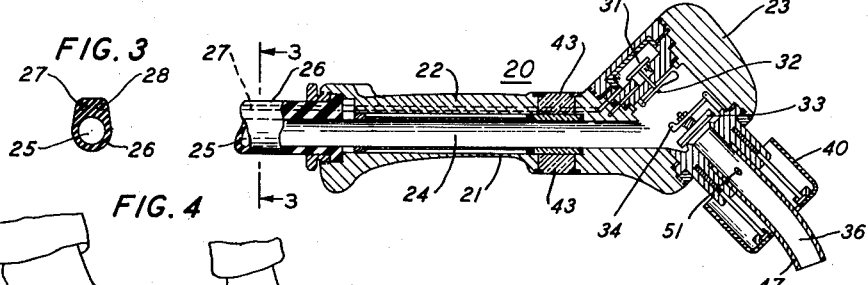
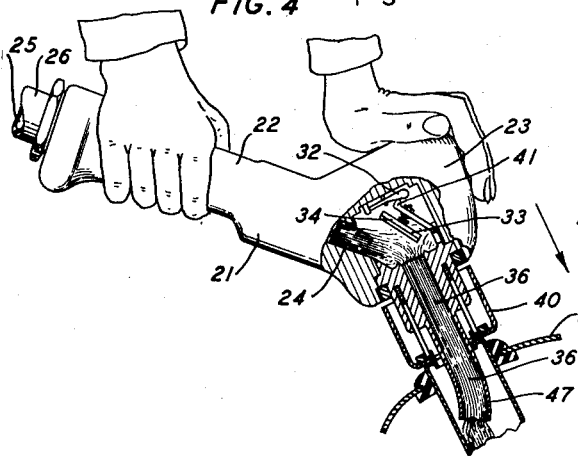
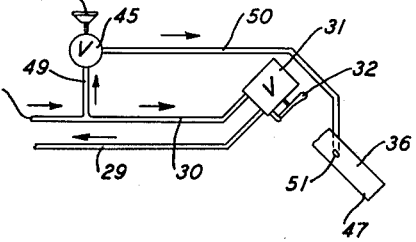
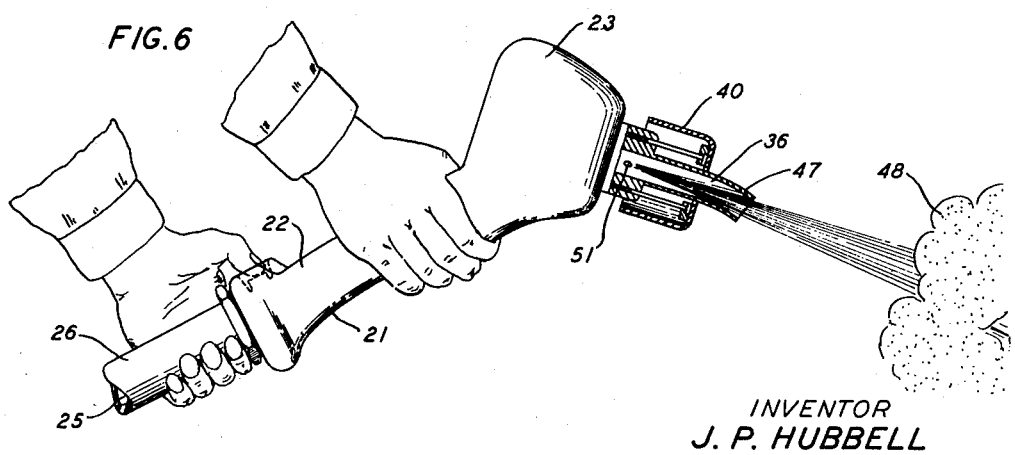
INVENTOR
J. P. HUBBELL
BY
Hugh S. Wertz
ATTORNEY Nov. 15, 1955     J. P. HUBBELL     2,723,793
NOZZLES
Filed Aug. 23, 1951     2 Sheets-Sheet 2
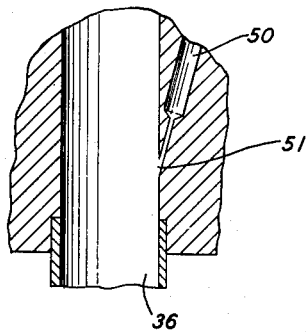
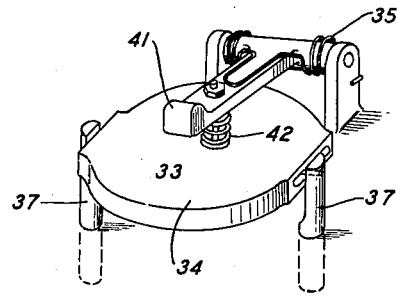
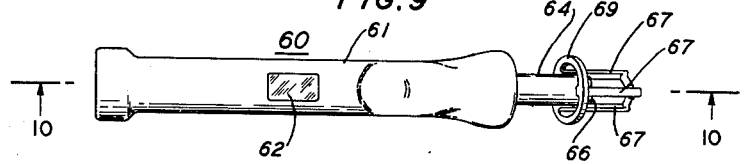
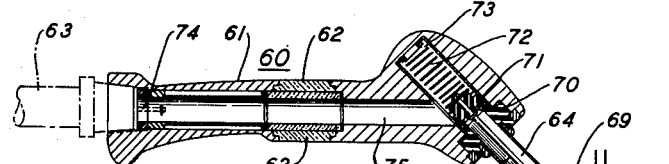
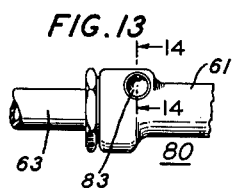
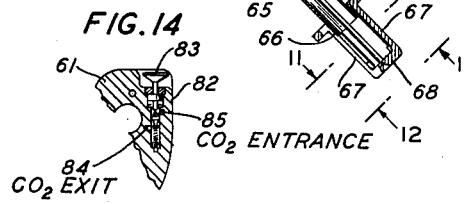
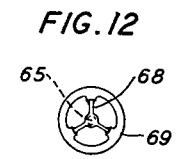
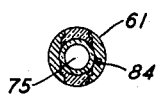
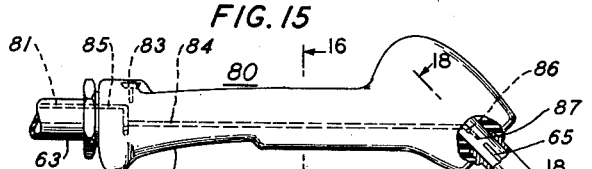
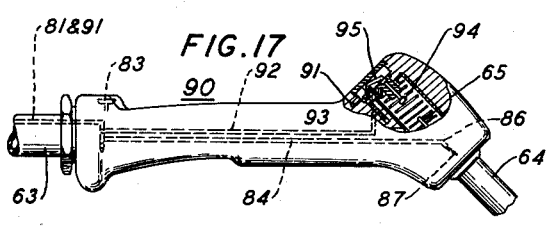
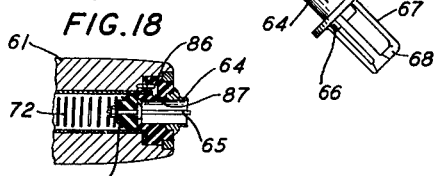
INVENTOR
J. P. HUBBELL
BY
Hugh S. Wertz
ATTORNEY

United States Patent Office 2,723,793
Patented Nov. 15, 1955

2,723,793

NOZZLES

Jesse P. Hubbell, Fanwood, N. J.

Application August 23, 1951, Serial No. 243,300

8 Claims. (Cl. 226—128)

This invention relates to nozzles for liquid fuel dispensers and more specifically to nozzles for gasoline dispensers equipped to extinguish fires. This application is a continuation-in-part of application Serial No. 152,378, filed March 28, 1950, by Jesse P. Hubbell.

It is an object of this invention to provide nozzles for the efficient dispensing of gasoline.

The dangers of flash-fires and explosions in and around gasoline dispensers or pumps should not be minimized. Almost all present-day devices of this character are driven by electric motors and there is accordingly the ever present danger that electric sparks therefrom will start a fire or explosion. Moreover, a carelessly tossed cigarette or match can easily start a fire in or around a gasoline pump. Once started, such oil or gasoline conflagrations are difficult to control, more especially if an attendant provided with a chemical fire extinguisher is not right on the spot. The invention of the above-identified application attacks this problem in a two-fold manner; (1) by making such fires more difficult to start since no electricity is used for operating purposes and (2) by providing as part of its mechanism very efficient fire-fighting apparatus. In one embodiment described in the parent application there is provided a gaseous pressure operated gasoline dispenser equipped to dispense Dry Ice snow for fire fighting. Preferably, this dispenser utilizes carbon dioxide both for operating the dispensing apparatus and for fire fighting or utilizes compressed air for operating purposes and carbon dioxide for fire fighting.

It is another object of the present invention to provide a single nozzle for dispensing either gasoline or Dry Ice snow. Such a nozzle can be used with the apparatus described in the parent application but it is not necessarily restricted to such a use.

Many other objects and features, some of them more or less closely related to those given above, will be apparent from the following description and the accompanying claims.

These objects and features are realized in accordance with the invention by providing as an exemplary embodiment thereof a nozzle for a gasoline dispenser and fire extinguisher which is called "Gas Master and Fire Fighter" and which is described in detail in the parent application. For simplicity in the following description, the terms "distributor" or "distributing device" are being used to designate the dispenser and extinguisher in combination. In order to provide a background for the description of certain of the nozzles in accordance with the present invention, the distributor will first be briefly described. The distributor delivers gasoline from a storage tank to a consumer using as its source of power a non-explosive gas under pressure, suitable gases being carbon dioxide or compressed air. It is arranged to deliver to the consumer any desired quantity of gasoline and is operated either manually or under control of one or more coins. The same gas used as a driving means (if it is carbon dioxide) can also be utilized to extinguish fires and prevent explosions in the immediate vicinity, the gas emerging from the same nozzle delivering the gasoline in the form of Dry Ice snow. The gasoline dispenser makes use of pressure-lift and gravity-discharge principles. The gasoline, after being lifted from the storage reservoir by the gaseous pressure, is stored in one of two metering tanks inside the distributor, one metering tank being filled as the other is being discharged. Each metering tank is calibrated to accept a definite amount of gasoline based on the predetermined price. The gasoline is discharged from the distributor by means of a special nozzle, in accordance with the invention, which controls both the flow of the gasoline being dispensed and of Dry Ice snow being used (when necessary) for fire fighting. The carbon dioxide, when used for operating purposes, immunizes the storage reservoir against explosions and fire and also replaces the gasoline taken therefrom. In another aspect of the invention, one form of nozzle is used for gasoline distribution only.

The invention will be more readily understood by referring to the following description taken in connection with the accompanying drawings forming a part thereof, in which:

Fig. 1 is a top view of a nozzle in accordance with the invention;

Fig. 2 is a cross-section of the nozzle of Fig. 1;

Fig. 3 is a cross-section of the hose attached to the nozzle of Figs. 1 and 2;

Fig. 4 is a front elevation view, with portions broken away, of the nozzle of Fig. 1 being used to deliver gasoline to a consumer's gas tank;

Fig. 5 is a functional schematic view of the carbon dioxide lines in the nozzle;

Fig. 6 is a front elevation view, with portions broken away, of the nozzle of Fig. 1 being used to discharge Dry Ice snow for fire fighting purposes;

Fig. 7 is an enlarged section of the expansion chamber in the nozzle of Fig. 1 for converting gaseous carbon dioxide to Dry Ice snow;

Fig. 8 is a perspective view of the gasoline valve in the nozzle of Fig. 1;

Fig. 9 is a plan view of another nozzle in accordance with the invention;

Fig. 10 is a sectional view of the embodiment shown in Fig. 9;

Fig. 11 is a sectional view through line 11—11 of Fig. 10 looking in the direction of the arrows;

Fig. 12 is an end view of the embodiment shown in Fig. 10 looking in the direction of the arrows 12;

Fig. 13 is a partial plan view of a modification of the embodiment of Fig. 9;

Fig. 14 is a sectional view through line 14—14 of Fig. 13;

Fig. 15 is a side elevation view of the arrangement partially shown in Fig. 13;

Fig. 16 is a sectional view through line 16—16 of Fig. 15;

Fig. 17 is a side elevation of still another embodiment of the invention; and

Fig. 18 is a sectional view of a portion of the arrangement of Fig. 17.

Referring more specifically to the drawings, Fig. 1 shows, by way of example for purposes of illustration, a nozzle 20 in accordance with the invention. This nozzle is particularly adapted for use with a fuel dispenser and a fire extinguisher combined in one device, the device being known as "Gas Master and Fire Fighter" and described in detail in the parent application, Serial No. 152,378, and briefly above. This description need not be repeated here, it being sufficient to point out that gasoline and carbon dioxide are applied to the nozzle 20 by appropriate pipes or tubes from the rest of the distributing apparatus.

Reference will now be made to Figs. 2 to 8, inclusive, as well as to Fig. 1. The nozzle 20 has a metal housing 21 having a convenient outer shape to fit the hands of the attendant as shown in Fig. 4, one hand grasping the barrel 22 of the housing and the other pushing down on a raised portion 23 thereof. This housing has a central chamber 24 which is connected to the main passage 25 in the flexible hose 26. The flexible tubes 27 and 28 in the hose 26 are connected, respectively, to the tubes 29 and 30 in the nozzle. The valve 31 in the upper part of the raised portion 23 is opened when the lever 32 is raised which action takes place when the flap 33 of the valve 34 is raised (Fig. 4). Portions of this flap valve 34 are shown in enlarged perspective in Fig. 8. A spring 35 holds the flap 33 closed over the gasoline delivery line 36. The flap is opened by rods 37 when the nozzle is pressed downward into the entry port of a gasoline tank 39 receiving fuel from the distributor. This movement causes the movable bell member 40 to move with respect to the housing 21 and cause the rods 37 to raise the flap 33 and hence the lip 41 which latter member engages the lever 32. This opens the valve 31, as pointed out above, and allows gasoline to flow to the spout 47 in the manner which will be described below. The spring 42 is provided to obtain proper setting of the flap 33. The housing 21 has two transparent ports 43 therein in order that the gasoline flowing in the passage 24 can be seen. The thumb button 44 for operating the valve 45 (see Fig. 5) is located in a raised portion 46 of the housing 21. For simplicity in the drawings, the details of the valve 45 have not been shown but any suitable valve operated by a push-button can be used. By way of example, the valve 45 may be like the valve 82 in Fig. 14.

Pressing the button 44 causes a blast of Dry Ice snow 48 (see Fig. 6) to leave the nozzle spout 47. The Dry Ice snow is formed by carbon dioxide (from the storage tank or Dry Ice converter in the distributor) which is conducted to the spout 47 through pipe 28 in the hose 26 and pipe 49 in the nozzle 20 (see Figs. 1, 2 and 5), valve 45 operated by the push button 44, pipe 50 and constricting orifice 51 (see Fig. 7). The sudden emergence of high pressure carbon dioxide from the small orifice 51 to the much greater space in the gasoline discharge passage 36 causes the formation of a blast of Dry Ice crystals which can be directed by moving the nozzle. The emergence of the carbon dioxide from the spout 47 to the unconfined space of the outside air causes even more Dry Ice snow crystals to be formed and causes those crystals already formed to be greatly enlarged. Before or after the gasoline has been delivered to the customer's tank, this tank can be immunized against fire and explosion by blowing a blast of Dry Ice snow into it.

When gasoline is being dispensed through the nozzle 20 into a gas tank, the valve 45 is closed and the valve 31 is opened and carbon dioxide from the tank in the distributor passes through the pipes 28 and 30, the valve 31, and pipes or tubes 29 and 27 to the equipment in the distributor (described in the parent application) which controls the flow of gasoline through the main passage 25 and gasoline delivery line 36 to the customer's gas tank. Thus the nozzle 20 can be used for either gas delivery or fire fighting, switching from one to the other very quickly.

Figs. 9 to 12, inclusive, show another embodiment of the invention which, unlike the arrangement of Figs. 1 to 8, inclusive, is not equipped for fire fighting. This nozzle 60 is designed to operate on present-day standard gasoline pumps and causes gasoline flow through its spout without the "triggering" which is usually necessary in present day gasoline nozzles. The nozzle 60 needs to be merely inserted into the inlet of the customer's fuel tank and held there under slight pressure. Thereupon, instant discharge of gasoline is effected. When this pressure is released, the flow of gasoline is instantly and automatically cut off.

The nozzle 60 comprises a housing 61 of metal or plastic having transparent windows 62 therein for viewing the flow of gasoline through the nozzle. At one end of the housing, the gas line 63 is connected while the other end has fastened thereto a delivery tube 64. Within the tube 64 there is positioned a valve actuating rod 65 which is connected at its lower end to a muzzle 66. The member 66 is, as shown in Figs. 11 and 12, composed of three rod-like members 67 held in position at the lower end by a circular open-work member 68 and at the upper end by a circular shoulder 69. The rod 65 is connected to the center of the member 68 and is provided near its upper end with a shoulder 70 which supports a plug member 71 serving as a valve seat. A spring 72 is coiled within a cavity 73 in the housing 61 and is compressed when the plug 71 is raised by the upward movement of the muzzle member 66 and the valve actuating rod 65. A choke member 74 is provided to cut off the flow of gasoline to the nozzle when the gasoline pressure is not up to the proper value.

When a customer is served from the nozzle 60, the muzzle or actuating end 66 is pushed into the open end of the tube leading to the gas tank of the car (such as is shown in Fig. 4). The operator then pushes down further on the body 61 of the nozzle 60 causing the shoulder 69 to contact the rim of the gas tank tube. Further pressure pushes the rod 65 up in the tube 64, raising the plug 71 from its seat and causing the spring 72 to contract. When the plug 71 is raised, gasoline flows from the gas line 63 through the central passage 75 in the housing 61 and the tube 64 to the gas tank. After the required amount of gasoline has been delivered to the customer's gas tank, the nozzle 60 is withdrawn from the gas tank and the plug 71 is returned to its seat by the action of the spring 72, and the flow of gas is stopped instantly.

Figs. 13 to 16, inclusive, show a nozzle 80 which is like that shown in Figs. 9 to 12, inclusive, except that it includes the fire fighting feature. This is accomplished by adding the small tubular channel 81 to the gasoline hose 63 and connecting this channel through passageway 85, valve 82 (see Fig. 14) controlled by push button 83, passageway 84, cavity 86, and the small passage 87. (Fig. 18, which is a cross-section of a portion of the arrangement of Fig. 15 as well as that of Fig. 17 except that in the latter the rod 65 extends farther upward, shows the position of the cavity 86 and the small passage 87 with respect to the delivery tube 64.) Except for these differences, the structure of Figs. 13 to 16, inclusive, is exactly like that of Figs. 9 to 12, inclusive, and similar reference characters have been used where the respective parts correspond.

When the nozzle of Fig. 15 and related figures is being used for gasoline delivery, it functions exactly as in the previously described embodiment. When it is being used as a Fire Fighter, the carbon dioxide from the storage tank in the distributor travels through the channel 81 in the hose 63 and the passageway 85 in the housing 61 to the valve 82. Pushing the button 83 down opens this valve and allows the carbon dioxide to flow through the passageway 84 in the housing 61 to the cavity 86 and thence through the small passage 87. Its sudden release from this small passage causes it to be converted into snow and it leaves the nozzle tube 64 in this form to smother the fire at which it is directed or prevent explosions.

Fig. 17 shows a nozzle 90 which is especially designed for use on the "Gasmaster" described in the parent application. Most of the parts are similar to those used in the nozzle 80 so will not be described again. The added feature is a part of a control fluid circuit for operating the "Gasmaster." The portion of this circuit within the nozzle 90 comprises a tube 91 in the hose 63 (in back of tube 81 in Fig. 17), a passageway 92 within the housing 61 to which the tube 91 connects, and a valve 93 for connecting the passageway 92 to the passageway 91. The valve 93 is opened when the plug 71 is raised to open the lower valve already described in connection with the nozzle 60. The valve 93 comprises an actuating rod 94 which is raised by the extension of rod 65 when the shoulder 69 of the basket 66 pushes downward against the lip of the tube leading to the customer's gas tank. The rod 94 rocks the rocker arm 95 to open the valve 93 connecting passageways 92 and 91. Either carbon dioxide or compressed air can be used as the control fluid for the "Gasmaster." This control fluid passes through the passageway 91 back to the operating portion of the "Gasmaster" to operate the valves which will cause the delivery of gasoline to the customer.

Obviously, various other modifications can be made in the embodiments described without departing from the spirit of the invention, as indicated in the claims.

What is claimed is:

1. A gasoline dispenser nozzle comprising a spout adapted to be inserted in the filling pipe of a gasoline tank, a movable member surrounding said spout and positioned to make contact with the end of said filling pipe as said spout is inserted in said pipe, a main gasoline passage member in said nozzle, a second passage member in said nozzle adapted to have control fluid passed therethrough, and valve means actuated by the movement of said movable member caused by contact with the end of said filling pipe as the spout is inserted therein for opening said main gasoline passage member and also opening said second passage member.

2. The combination of elements as in claim 1 in which said movable member comprises a member positioned to remain completely outside said filling pipe.

3. The combination of elements as in claim 1 in which said movable member comprises a member positioned to remain completely outside said filling pipe and having a rod therein which is moved to actuate said valve means.

4. The combination of elements as in claim 1 in which said movable member comprises a member all of which is adapted to fit within said filling pipe with the exception of a shoulder at the upper part thereof which contacts the rim of said filling pipe.

5. The combination of elements as in claim 1 in which said movable member comprises a member all of which is adapted to fit within said filling pipe with the exception of a shoulder at the upper part thereof which contacts the rim of said filling pipe and having a rod therein which is moved to actuate said valve means.

6. The combination of elements as in claim 1 in further combination with push-button controlled means in said nozzle for supplying carbon dioxide to said spout.

7. The combination of elements as in claim 1 in further combination with additional valve controlled means in said nozzle for supplying carbon dioxide to said spout.

8. The combination of elements as in claim 1 in which said movable member comprises a member all of which is adapted to fit within said filling pipe with the exception of a shoulder at the upper part thereof which contacts the rim of said filling pipe and in further combination with additional valve controlled means in said nozzle for supplying carbon dioxide to said spout.

References Cited in the file of this patent

UNITED STATES PATENTS

| | | |
|---|---|---|
| 180,891 | Kranushaar | Aug. 8, 1876 |
| 597,292 | Linder et al. | Jan. 11, 1898 |
| 824,249 | Kleninfeldt | June 26, 1906 |
| 1,526,001 | La Rue | Feb. 10, 1925 |
| 1,903,139 | Trompeter | Mar. 28, 1933 |
| 1,920,165 | Andvig | Aug. 1, 1933 |

FOREIGN PATENTS

| | | |
|---|---|---|
| 26,820 | Great Britain | Nov. 16, 1897 |